US010680836B1

(12) United States Patent
Sironi et al.

(10) Patent No.: US 10,680,836 B1
(45) Date of Patent: Jun. 9, 2020

(54) VIRTUALIZED CHASSIS WITH POWER-OVER-ETHERNET FOR NETWORKING APPLICATIONS

(71) Applicant: Cisco Technology, Inc., San Jose, CA (US)

(72) Inventors: Paolo Sironi, Gallarate (IT); Sushin Suresan Adackaconam, San Jose, CA (US); Joel Goergen, Soulsbyville, CA (US); Roberto Gianella, Settimo Milanese (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/284,400

(22) Filed: Feb. 25, 2019

(51) Int. Cl.
*H04L 12/10* (2006.01)
*H02M 1/32* (2007.01)
(Continued)

(52) U.S. Cl.
CPC ............ *H04L 12/10* (2013.01); *H01H 83/10* (2013.01); *H01H 83/22* (2013.01); *H02M 1/32* (2013.01)

(58) Field of Classification Search
CPC ......... H02M 1/32; H01H 83/10; H01H 83/22; H04L 12/10
See application file for complete search history.

(56) References Cited

U.S. PATENT DOCUMENTS

| 3,335,324 A | 8/1967 | Buckeridge |
| 4,811,187 A | 3/1989 | Nakajima |

(Continued)

FOREIGN PATENT DOCUMENTS

| CN | 1209880 C | 7/2005 |
| CN | 201689347 U | 12/2010 |

(Continued)

OTHER PUBLICATIONS

Product Overview, "Pluribus VirtualWire Solution", Pluribus Networks, PN-PO-VWS-050818, https://www.pluribusnetworks.com/assets/Pluribus-VirtualWire-PO-50918.pdf, May 2018, 5 pages.

(Continued)

*Primary Examiner* — Jue Zhang
*Assistant Examiner* — Kevin H Sprenger
(74) *Attorney, Agent, or Firm* — Cindy Kaplan (57) ABSTRACT

An apparatus comprises an Ethernet port including high-side transformers and low-side transformers. High-side current paths supply high-side currents form a high voltage rail to high-side center taps of the high-side transformers. Low-side current paths supply or do not supply low-side currents from a low voltage rail to low-side center taps of the low-side transformers, and convert the low-side currents to sense voltages. A controller configures the low-side current paths to either supply or not supply the low-side currents to the low-side center taps when none of the sense voltages exceed a voltage threshold representative of an overcurrent threshold or when at least one of the sense voltages exceeds the voltage threshold, respectively. A current monitor injects additional current into the low-side current paths only when at least one of the high-side currents exceeds the overcurrent threshold.

19 Claims, 5 Drawing Sheets

(51) Int. Cl.
*H01H 83/10* (2006.01)
*H01H 83/22* (2006.01)

(56) References Cited

U.S. PATENT DOCUMENTS

| | | | |
|---|---|---|---|
| 5,652,893 | A | 7/1997 | Ben-Meir |
| 6,008,631 | A | 12/1999 | Johari |
| 6,220,955 | B1 | 4/2001 | Posa |
| 6,259,745 | B1 | 7/2001 | Chan |
| 6,636,538 | B1 | 10/2003 | Stephens |
| 6,685,364 | B1 | 2/2004 | Brezina |
| 6,826,368 | B1 | 11/2004 | Koren |
| 6,855,881 | B2 | 2/2005 | Khoshnood |
| 6,860,004 | B2 | 3/2005 | Hirano |
| 7,325,150 | B2 | 1/2008 | Lehr |
| 7,420,355 | B2 | 9/2008 | Liu |
| 7,490,996 | B2 | 2/2009 | Sommer |
| 7,492,059 | B2 | 2/2009 | Peker |
| 7,509,505 | B2 | 3/2009 | Randall |
| 7,583,703 | B2 | 9/2009 | Bowser |
| 7,589,435 | B2 | 9/2009 | Metsker |
| 7,593,747 | B1 | 9/2009 | Karam |
| 7,603,570 | B2 | 10/2009 | Schindler |
| 7,616,465 | B1 | 11/2009 | Vinciarelli |
| 7,813,646 | B2 | 10/2010 | Furey |
| 7,835,389 | B2 | 11/2010 | Yu |
| 7,854,634 | B2 | 12/2010 | Filipon |
| 7,881,072 | B2 | 2/2011 | DiBene |
| 7,915,761 | B1 | 3/2011 | Jones |
| 7,921,307 | B2 | 4/2011 | Karam |
| 7,924,579 | B2 | 4/2011 | Arduini |
| 7,940,787 | B2 | 5/2011 | Karam |
| 7,973,538 | B2 | 7/2011 | Karam |
| 8,020,043 | B2 | 9/2011 | Karam |
| 8,037,324 | B2 | 10/2011 | Hussain |
| 8,081,589 | B1 | 12/2011 | Gilbrech |
| 8,184,525 | B2 | 5/2012 | Karam |
| 8,276,397 | B1 | 10/2012 | Carlson |
| 8,279,883 | B2* | 10/2012 | Diab ............... H04L 12/40045 370/389 |
| 8,310,089 | B2 | 11/2012 | Schindler |
| 8,319,627 | B2 | 11/2012 | Chan |
| 8,345,439 | B1 | 1/2013 | Goergen et al. |
| 8,350,538 | B2 | 1/2013 | Cuk |
| 8,358,893 | B1 | 1/2013 | Sanderson |
| 8,700,923 | B2 | 4/2014 | Fung |
| 8,712,324 | B2 | 4/2014 | Corbridge |
| 8,750,710 | B1 | 6/2014 | Hirt |
| 8,781,637 | B2 | 7/2014 | Eaves |
| 8,787,775 | B2 | 7/2014 | Earnshaw |
| 8,829,917 | B1 | 9/2014 | Lo |
| 8,836,228 | B2 | 9/2014 | Xu |
| 8,842,430 | B2 | 9/2014 | Hellriegel |
| 8,849,471 | B2 | 9/2014 | Daniel |
| 8,966,747 | B2 | 3/2015 | Vinciarelli |
| 9,019,895 | B2 | 4/2015 | Li |
| 9,024,473 | B2 | 5/2015 | Huff |
| 9,184,795 | B2 | 11/2015 | Eaves |
| 9,189,036 | B2 | 11/2015 | Ghoshal |
| 9,189,043 | B2 | 11/2015 | Vorenkamp |
| 9,273,906 | B2 | 3/2016 | Goth |
| 9,319,101 | B2 | 4/2016 | Lontka |
| 9,321,362 | B2 | 4/2016 | Woo |
| 9,373,963 | B2 | 6/2016 | Kuznelsov |
| 9,419,436 | B2 | 8/2016 | Eaves |
| 9,510,479 | B2 | 11/2016 | Vos |
| 9,531,551 | B2 | 12/2016 | Balasubramanian |
| 9,590,811 | B2 | 3/2017 | Hunter, Jr. |
| 9,618,714 | B2 | 4/2017 | Murray |
| 9,640,998 | B2 | 5/2017 | Dawson |
| 9,665,148 | B2 | 5/2017 | Hamdi |
| 9,693,244 | B2 | 6/2017 | Maruhashi |
| 9,734,940 | B1 | 8/2017 | McNutt |
| 9,853,689 | B2 | 12/2017 | Eaves |
| 9,874,930 | B2 | 1/2018 | Vavilala |
| 9,882,656 | B2 | 1/2018 | Sipes, Jr. |
| 9,893,521 | B2 | 2/2018 | Lowe |
| 9,948,198 | B2 | 4/2018 | Imai |
| 9,979,370 | B2* | 5/2018 | Xu ............... H03H 7/0115 |
| 9,985,600 | B2* | 5/2018 | Xu ............... H05K 1/0231 |
| 10,007,628 | B2 | 6/2018 | Pitigoi-Aron |
| 10,028,417 | B2 | 7/2018 | Schmidtke et al. |
| 10,128,764 | B1 | 11/2018 | Vinciarelli |
| 10,248,178 | B2 | 4/2019 | Brooks |
| 10,407,995 | B2 | 9/2019 | Moeny |
| 10,439,432 | B2 | 10/2019 | Eckhardt |
| 2001/0024373 | A1 | 9/2001 | Cuk |
| 2002/0126967 | A1 | 9/2002 | Panak |
| 2004/0000816 | A1 | 1/2004 | Khoshnood |
| 2004/0033076 | A1 | 2/2004 | Song |
| 2004/0043651 | A1 | 3/2004 | Bain |
| 2004/0073703 | A1 | 4/2004 | Boucher |
| 2005/0197018 | A1 | 9/2005 | Lord |
| 2005/0268120 | A1 | 12/2005 | Schindler |
| 2006/0202109 | A1 | 9/2006 | Delcher |
| 2006/0209875 | A1* | 9/2006 | Lum ............... H04L 12/10 370/445 |
| 2007/0103168 | A1 | 5/2007 | Batten |
| 2007/0236853 | A1* | 10/2007 | Crawley ............... H04L 12/10 361/119 |
| 2007/0263675 | A1* | 11/2007 | Lum ............... H04L 12/10 713/300 |
| 2007/0284946 | A1 | 12/2007 | Robbins |
| 2007/0288125 | A1 | 12/2007 | Quaratiello |
| 2008/0198635 | A1 | 8/2008 | Hussain |
| 2008/0229120 | A1 | 9/2008 | Diab |
| 2008/0310067 | A1 | 12/2008 | Diab |
| 2010/0077239 | A1 | 3/2010 | Diab |
| 2010/0117808 | A1 | 5/2010 | Karam |
| 2010/0171602 | A1 | 7/2010 | Kabbara |
| 2010/0190384 | A1 | 7/2010 | Lanni |
| 2010/0237846 | A1* | 9/2010 | Vetteth ............... H04L 12/10 323/305 |
| 2010/0290190 | A1 | 11/2010 | Chester |
| 2011/0290497 | A1 | 1/2011 | Stenevik |
| 2011/0083824 | A1 | 4/2011 | Rogers |
| 2011/0228578 | A1 | 9/2011 | Serpa |
| 2011/0266867 | A1 | 11/2011 | Schindler |
| 2012/0064745 | A1 | 3/2012 | Ottliczky |
| 2012/0170927 | A1 | 7/2012 | Huang |
| 2012/0201089 | A1 | 8/2012 | Barth |
| 2012/0231654 | A1 | 9/2012 | Conrad |
| 2012/0317426 | A1 | 12/2012 | Hunter, Jr. |
| 2012/0319468 | A1 | 12/2012 | Schneider |
| 2013/0077923 | A1 | 3/2013 | Weem |
| 2013/0079633 | A1 | 3/2013 | Weem |
| 2013/0103220 | A1 | 4/2013 | Eaves |
| 2013/0249292 | A1 | 9/2013 | Blackwell, Jr. |
| 2013/0272721 | A1 | 10/2013 | Van Veen |
| 2014/0111180 | A1* | 4/2014 | Vladan ............... H04L 12/413 323/312 |
| 2014/0129850 | A1 | 5/2014 | Paul |
| 2014/0258742 | A1 | 9/2014 | Chien |
| 2014/0265550 | A1* | 9/2014 | Milligan ............... H04L 12/10 307/1 |
| 2014/0372773 | A1* | 12/2014 | Heath ............... H04L 12/10 713/300 |
| 2015/0078740 | A1 | 3/2015 | Sipes, Jr. |
| 2015/0106539 | A1 | 4/2015 | Leinonen |
| 2015/0115741 | A1* | 4/2015 | Dawson ............... G06F 1/266 307/125 |
| 2015/0215001 | A1 | 7/2015 | Eaves |
| 2015/0215131 | A1* | 7/2015 | Paul ............... G06F 1/26 713/300 |
| 2015/0333918 | A1 | 11/2015 | White, III |
| 2016/0020911 | A1 | 1/2016 | Sipes, Jr. |
| 2016/0064938 | A1 | 3/2016 | Balasubramanian |
| 2016/0111877 | A1 | 4/2016 | Eaves |
| 2016/0118784 | A1 | 4/2016 | Saxena |
| 2016/0133355 | A1* | 5/2016 | Glew ............... H01B 7/295 248/49 |
| 2016/0134331 | A1 | 5/2016 | Eaves |
| 2016/0142217 | A1 | 5/2016 | Gardner |

(56) References Cited

U.S. PATENT DOCUMENTS

| | | |
|---|---|---|
| 2016/0197600 A1 | 7/2016 | Kuznetsov |
| 2016/0365967 A1 | 7/2016 | Tu |
| 2016/0241148 A1 | 8/2016 | Kizilyalli |
| 2016/0262288 A1 | 9/2016 | Chainer |
| 2016/0273722 A1* | 9/2016 | Crenshaw ............. H02J 7/0021 |
| 2016/0294500 A1 | 10/2016 | Chawgo |
| 2016/0308683 A1 | 10/2016 | Pischl |
| 2016/0352535 A1 | 12/2016 | Hiscock |
| 2017/0041152 A1* | 2/2017 | Sheffield ................ H04B 3/542 |
| 2017/0041153 A1* | 2/2017 | Picard ..................... H04L 12/10 |
| 2017/0054296 A1 | 2/2017 | Daniel |
| 2017/0110871 A1 | 4/2017 | Foster |
| 2017/0123466 A1 | 5/2017 | Carnevale |
| 2017/0146260 A1 | 5/2017 | Ribbich |
| 2017/0155517 A1 | 6/2017 | Cao |
| 2017/0164525 A1 | 6/2017 | Chapel |
| 2017/0155518 A1 | 7/2017 | Yang |
| 2017/0214236 A1 | 7/2017 | Eaves |
| 2017/0229886 A1 | 8/2017 | Eaves |
| 2017/0234738 A1 | 8/2017 | Ross |
| 2017/0248976 A1 | 8/2017 | Moller |
| 2017/0325320 A1 | 11/2017 | Wendt |
| 2018/0024964 A1 | 1/2018 | Mao et al. |
| 2018/0053313 A1* | 2/2018 | Smith ..................... G06T 7/292 |
| 2018/0054083 A1 | 2/2018 | Hick |
| 2018/0060269 A1 | 3/2018 | Kessler |
| 2018/0088648 A1 | 3/2018 | Otani |
| 2018/0098201 A1 | 4/2018 | Torello |
| 2018/0102604 A1 | 4/2018 | Keith |
| 2018/0123360 A1 | 5/2018 | Eaves |
| 2018/0188712 A1 | 7/2018 | MacKay |
| 2018/0191513 A1 | 7/2018 | Hess |
| 2018/0254624 A1 | 9/2018 | Son |
| 2018/0313886 A1 | 11/2018 | Mlyniec |
| 2019/0267804 A1 | 8/2019 | Matan |
| 2019/0280895 A1 | 9/2019 | Mather |

FOREIGN PATENT DOCUMENTS

| | | |
|---|---|---|
| CN | 204836199 U | 12/2015 |
| CN | 205544597 | 8/2016 |
| CN | 104081237 B | 10/2016 |
| CN | 104412541 B | 5/2019 |
| EP | 1936861 A1 | 6/2008 |
| EP | 2120443 A1 | 11/2009 |
| EP | 2693688 A1 | 2/2014 |
| WO | WO199316407 A1 | 8/1993 |
| WO | WO2010053542 | 5/2010 |
| WO | WO2017054030 | 4/2017 |
| WO | WO2017167926 A1 | 10/2017 |
| WO | WO2018017544 A1 | 1/2018 |
| WO | WO2019023731 A1 | 2/2019 |

OTHER PUBLICATIONS

Implementation Guide, "Virtual Chassis Technology Best Practices", Juniper Networks, 8010018-009-EN, Jan. 2016, https://www.juniper.net/us/en/local/pdf/implementation-guides/8010018-en.pdf, 29 pages.
https://www.fischerconnectors.com/us/en/products/fiberoptic.
http://www.strantech.com/products/tfoca-genx-hybrid-2x2-fiber-optic-copper-connector/.
http://www.qpcfiber.com/product/connectors/e-link-hybrid-connector/.
https://www.lumentum.com/sites/default/files/technical-library-items/poweroverfiber-tn-pv-ae_0.pdf.
"Network Remote Power Using Packet Energy Transfer", Eaves et al., www.voltserver.com, Sep. 2012.
Yencheck, Thermal Modeling of Portable Power Cables, 1993.
Zhang, Machine Learning-Based Temperature Prediction for Runtime Thermal Management across System Components, Mar. 2016.
Data Center Power Equipment Thermal Guidelines and Best Practices.
Dynamic Thermal Rating of Substation Terminal Equipment by Rambabu Adapa, 2004.
Chen, Real-Time Termperature Estimation for Power MOSEFETs Conidering Thermal Aging Effects:, IEEE Trnasactions on Device and Materials Reliability, vol. 14, No. 1, Mar. 2014.

* cited by examiner

VIRTUALIZED CHASSIS WITH POWER-OVER-ETHERNET FOR NETWORKING APPLICATIONS

TECHNICAL FIELD

The present disclosure relates to power-over-Ethernet with network devices.

BACKGROUND

A network device, such as a router, capable of handling a large volume of traffic typically includes a single chassis or rack of plug-in network cards, including network device controllers, line cards, fabric cards, and power equipment to power the cards. For large scale network applications, the line cards and the fabric cards each require substantial power. Often, there is a desire to distribute functionality of the network device across different locations, which is not possible when the network device is implemented in the single rack. Also, if the network cards are distributed across the different locations, power must be provided to the cards at each location. Facility power at any given location may be unavailable or insufficient. Using power-over-Ethernet (PoE), power sourcing equipment (PSE) may deliver power from one location to remote equipment, e.g., to line cards at a remote location; however, limitations associated with conventional PSE and PoE may prevent the delivery of sufficient power to the remote equipment.

DESCRIPTION OF EXAMPLE EMBODIMENTS

Overview

An apparatus is provided that comprises an Ethernet port including transformers to couple respective data and power to an Ethernet cable. The transformers include high-side transformers and low-side transformers. The apparatus also includes high-side current paths to supply respective high-side currents form a high voltage rail to respective high-side center taps of the high-side transformers. The apparatus also includes low-side current paths configurable to supply or not supply respective low-side currents from a low voltage rail to respective low-side center taps of the low-side transformers, and to convert the respective low-side currents to respective sense voltages. The apparatus further includes a controller to selectively configure the low-side current paths to either supply or not supply the low-side currents to the respective low-side center taps when none of the sense voltages exceed a voltage threshold representative of an overcurrent threshold or when at least one of the sense voltages exceeds the voltage threshold, respectively. The apparatus further includes a current monitor to inject additional current into the low-side current paths only when at least one of the high-side currents exceeds the overcurrent threshold, to cause at least one of the sense voltages to exceed the voltage threshold, and cause the controller to configure the low-side current paths to not supply the low-side currents to the low-side center taps.

EXAMPLE EMBODIMENTS

Figure 1:
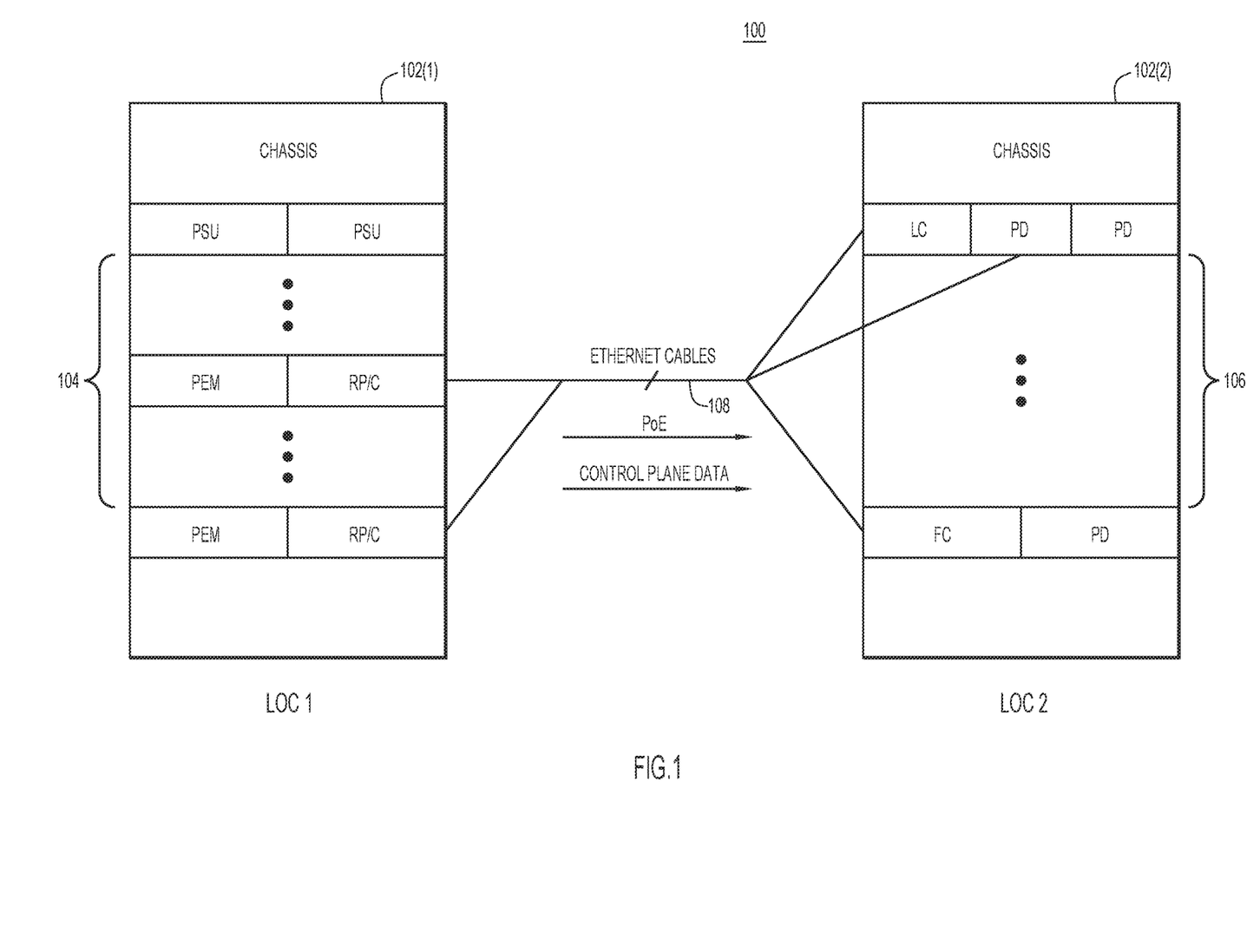
FIG. 1 is a high-level block diagram of a disaggregated network device implemented using a virtualized (i.e., virtual) chassis that distributes network control and switch functions, as well as power, over a geographical area, according to an example embodiment.

Referring first to FIG. 1, there is shown a high-level block diagram of a disaggregated network device 100 implemented using a virtualized (i.e., virtual) chassis that distributes various operational modules and functions of the network device, and power for the modules, over a geographical area. In an example, network device 100 may serve as a network router, and/or may implement other components of network. To this end, disaggregated network device 100 includes a first multi-shelf rack or chassis 102(1) at a first location LOC1 and a second multi-shelf rack or chassis 102(2) at a second location LOC2 separated from the first location. Chassis 102(1) includes shelves that carry first plug-in modules or cards 104 of network device 100, while chassis 102(2) includes shelves that carry second plug-in modules or cards 106 of the network device. Ethernet cables 108 connect Ethernet ports (not shown) of various ones of cards 104 to Ethernet ports (not shown) of various ones of cards 106. Ethernet cables 108 carry Ethernet data between cards 104 and 106, and provide power-over-Ethernet (PoE) from cards 104 to 106.

More specifically, cards 104 of chassis 102(1) include network device processor/control (RP/C) cards to implement functions for a control plane and a management plane for network routing. Cards 104 also include power supply units (PSUs) and power entry modules (PEMs). The PSUs generate power to power the local RP/C cards and also to power the cards of chassis 102(2). The PEMs connect the PSUs (i.e., the power from the PSUs) to circuits of the RP/C cards and to the Ethernet ports of the RP/C cards. The Ethernet ports couple the power to Ethernet cables 108 for the PoE. In this way, generally, chassis 102(1) and cards 104 represent power sourcing equipment (PSE) to supply the PoE to cards 106 of chassis 102(2).

Cards 106 of chassis 102(2) include switch line cards (more simply referred to as line cards (LCs)), switch fabric cards (FCs), and PoE powered devices (PDs). The PDs include Ethernet ports (not shown) coupled to Ethernet cables 108 to receive the data and the PoE from the Ethernet cables. The PDs convert the PoE to converted power for the line cards and the fabric cards. That is, the PDs convert the PoE supplied by PSE cards of chassis 102(1) to local, converted power for the switch line cards and the fabric cards of chassis 102(2).

In a network, one or more network devices in the network implement a control plane, a management plane, and a data plane of the network. The control plane and the management plane serve the data plane, which bears traffic carried by the network. The management plane carries administrative traffic, and may be considered a subset of the control plane. The control plane carries messages/commands to implement control plane features. Control plane messages/commands and features include:

a. Information related to an environmental status of equipment in the network, such as temperature of the equipment, environmental monitoring (e.g., for pressure and humidity), voltages on voltage rails, and equipment alarms.
b. Provisioning of line cards and fabric cards in the network, including interface enable/disable, protocol provisioning, physical interface activation, line/fabric card power ON/OFF, encryption and security enablement.
c. Telemetry, including interface performance monitoring, bit error rate, status of links, and quality of service (QoS).

In disaggregated network device 100, the RP/C cards of chassis 102(1) manage the control plane. To this end, the RP/C cards of chassis 102(1) provide the messages/commands associated with the control plane to cards 106 of chassis 102(2) over Ethernet cables 108. In addition, cards 104 (e.g., the RP/C cards) deliver PoE to cards 106 over Ethernet cables 108. According to embodiments presented herein, cards 104 may deliver "high power" PoE to the PDs among cards 106. That is, cards 104 may deliver PoE up to and including approximately 300 Watts (W), in excess of existing PoE standards.

Figure 2:
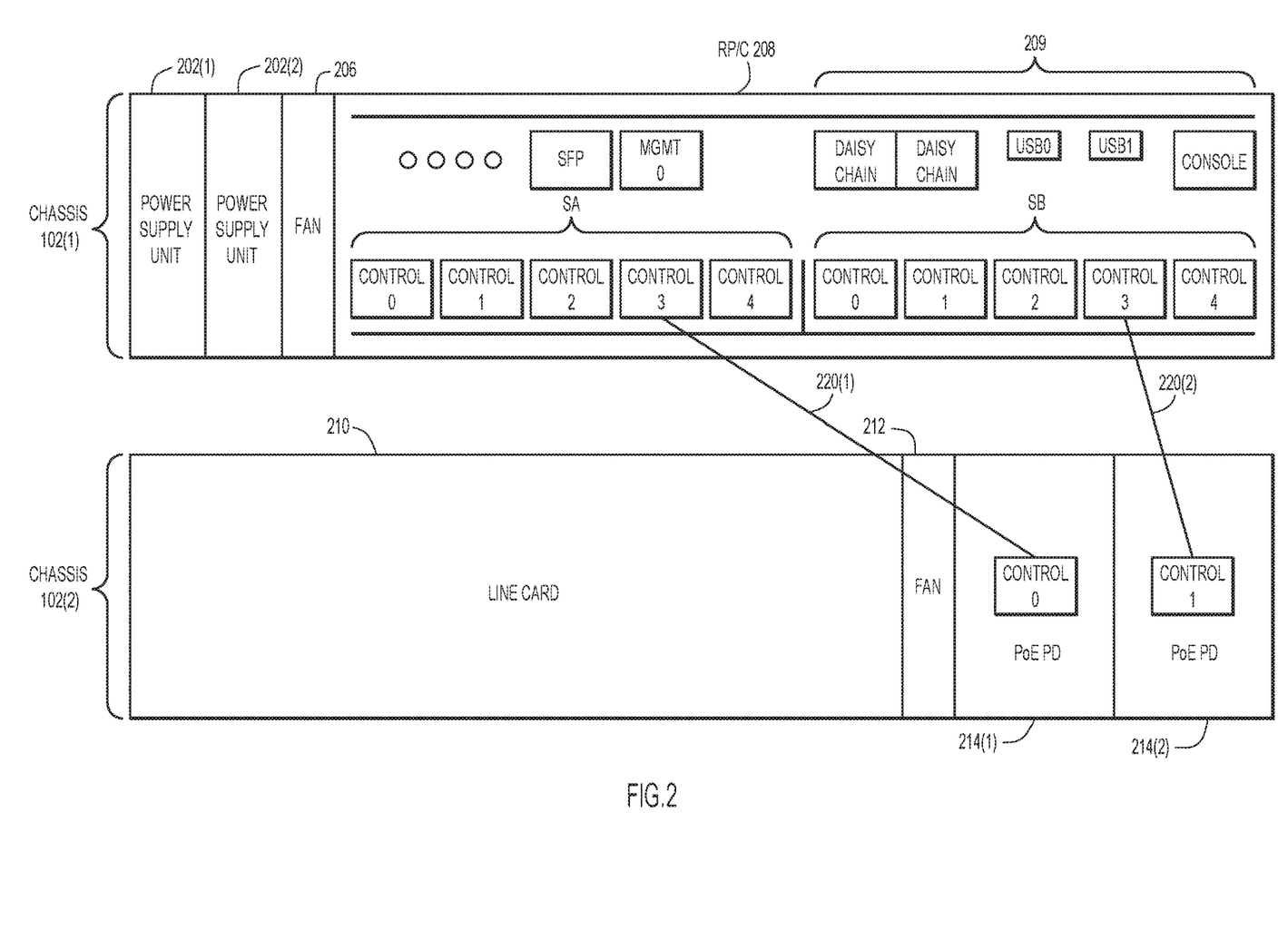
FIG. 2 is an illustration of a configuration of the disaggregated network device, according to an example embodiment.

With reference to FIG. 2, there is an illustration of an example configuration of disaggregated network device 100. The example of FIG. 2 provides a relatively minimized configuration, and relatively more complex configurations are possible. In the example of FIG. 2, chassis 102(1) carries multiple PSUs 202(1) and 202(2) (collectively referred to as PSUs 202), a fan 206, and an RP/C card 208, which has a first set SA of Ethernet ports P0-P4 (labeled "Control 0"-"Control 4") and a second set SB of Ethernet ports P0-P4. RP/C card 208 includes indicators and additional connectors 209. PSUs 202 generate power to operate fan 206 and RP/C card 208. PSUs 202 also provide PoE power to Ethernets ports P0-P4 and P0-P4 of sets SA and SB, respectively.

In the example of FIG. 2, chassis 102(2) includes a line card 210, a fan 212, and multiple PDs 214(1) and 214(2), which have respective Ethernet ports P0 (labeled "Control 0") and P1 (labeled "Control P1") (also referred to below as Ethernet ports PA and PB in connection with FIG. 4). Additionally, Ethernet cables 220(1) and 220(2) connect RP/C card 208 to respective ones of PDs 214(1) and 214(2). More specifically, Ethernet cable 220(1) connects set SA Ethernet port P3 of RP/C card 208 to Ethernet port P0 of PD 214(1), and Ethernet cable 220(2) connects set SB Ethernet port P3 of the RP/C card to Ethernet port P1 of the PD.

With respect to PoE, Ethernet cable 220(1) carries PoE originated at PSUs 202 to PD 214(1). In parallel, Ethernet cable 220(2), carries PoE originated at PSUs 202 to PD 214(2). PDs 214(1) and 214(2) receive the PoE from respective Ethernet cables 220(1) and 220(2), in parallel, and convert the received PoE to converted power for use by line card 210. In an embodiment, a sum of the converted powers produced by PDs 214(1) and 214(2) may be used to power line card 210. In another embodiment, one of the converted powers may be used as primary power for line card 210, while the other may be used as fail-over power in case the primary power fails.

Circuit diagrams are describe below in connection with FIGS. 3 and 4. The circuit diagrams indicate values for electrical voltages, currents, powers, and resistances by way of example, only. It is understood that the values are examples, only, and other values may be used. Also, in the description below, the term "coupled/connected to" is construed broadly to cover arrangements in which two components are directly connected to each other (i.e., without any intervening component) and indirectly connected to each through one or more intervening components.

Figure 3:
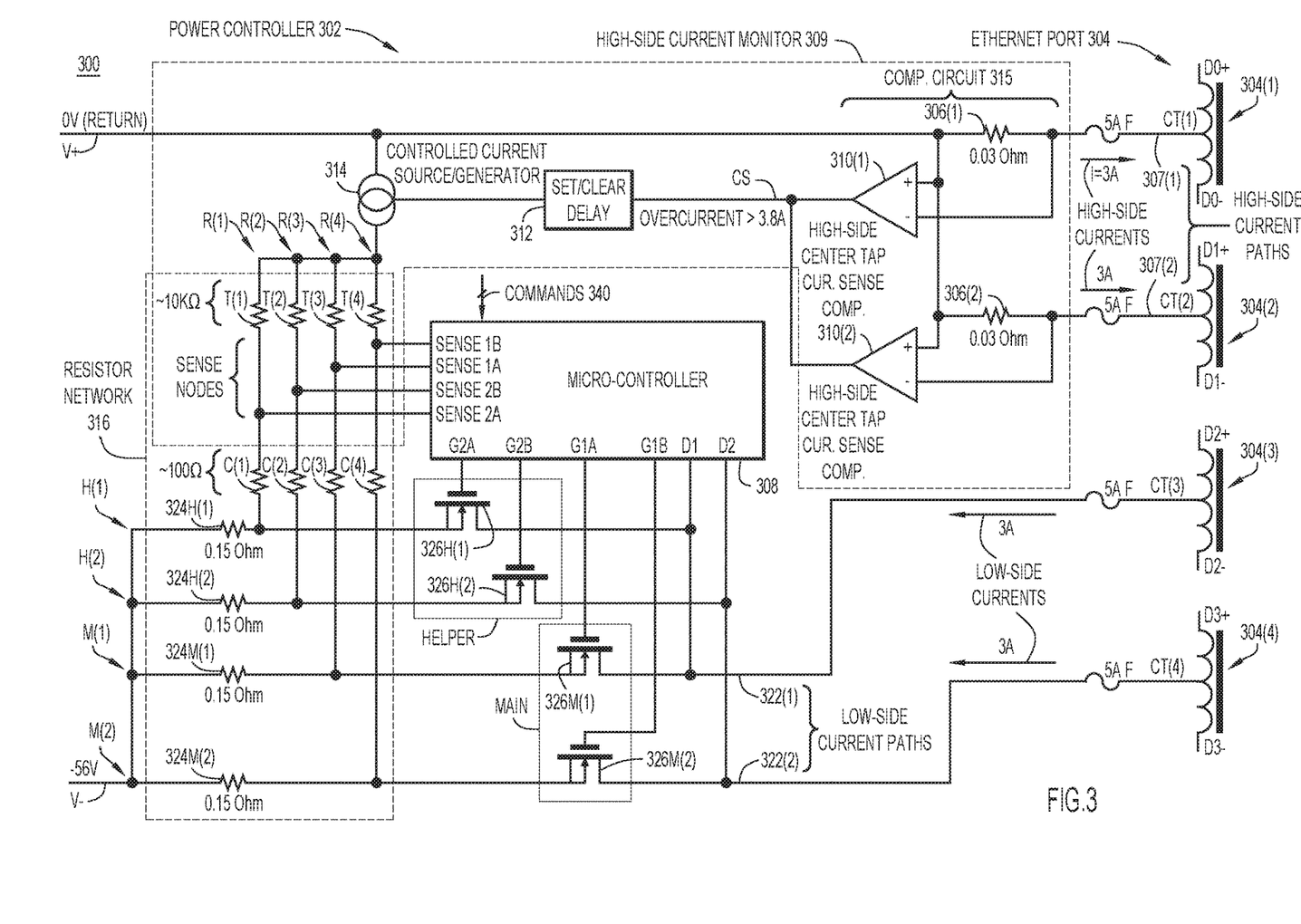
FIG. 3 is a circuit diagram of a power sourcing equipment (PSE) circuit including a power controller and an Ethernet port to generate and control power-over-Ethernet (PoE) that may be used in the configuration of FIG. 2, according to an example embodiment.

With reference to FIG. 3, there is a circuit diagram of an example PSE circuit 300 that may be implemented in chassis 102(1) of the configuration of FIG. 2 (or in FIG. 1). As shown in FIG. 3, PSE circuit 300 includes a power controller 302 coupled to an Ethernet port 304 (e.g., Ethernet port P0 of set SA shown in FIG. 2). Typically, Ethernet port P0 includes an RJ45 connector to mate with a corresponding connector of an Ethernet cable. For example, power controller 302 controls the PoE supplied to Ethernet port 304 and onto an Ethernet cable (e.g., Ethernet cable 220(1)) when the Ethernet cable is coupled to the Ethernet port. Power controller 302 may be implemented as part of PSUs 202; however, the power controller may be implemented in other arrangements that include one or more PEMs, for example. In an example, PSE circuit 300 advantageously delivers up to and including approximately 360 W of PoE to an Ethernet cable coupled to (single) Ethernet port P0, which exceeds the capability of conventional PSE circuits.

Ethernet port 304 includes high-side transformers 304(1), 304(2) having respective high-side coil center taps CT(1), CT(2), and low-side transformers 304(3), 304(4) having respective low-side coil center taps CT(3) and CT(4). Each transformer 304(1)-304(4) also includes opposing (coil) end terminals for connections to respective data lines carrying respective different data (D0+, D0−)-(D3+, D3−), respectively. In the 360 W example mentioned above, transformers 304(1)-304(4) support 4 parallel PoE channels at up to 90 W each, e.g., each transformer can couple 90 W to a respective one of the 4 channels. In the present description, the terms "high-side" and "low-side" are synonymous with, and may be replaced by, the terms "first" and "second," respectively.

Power controller 302 includes a high voltage power rail V+ (also referred to simply as a "high voltage rail V+") held at a high voltage and a low voltage power rail V− (also referred to simply as a "low voltage rail V−") held at a low voltage that is less than the high voltage. The high and low voltages may include Ethernet compliant power voltages, such as 0V and −56V, although other voltages are possible. High voltage rail V+ is coupled to center taps CT(1), CT(2) of high-side transformers 304(1), 304(2) through sense resistors 306(1), 306(2) and respective fuses F, respectively. Thus, high voltage rail V+ supplies respective high-side currents to center taps CT(1), CT(2) through respective high-side sense resistors 306(1), 306(2) and respective fuses F. In the example of FIG. 3, each high-side current may be up approximately 3 Amps (A). Sense resistors 306(1), 306(2) and respective fuses F represent/provide high-side current paths 307(1), 307(2) to supply the high-side currents from high voltage rail V+ to center taps CT(1), CT(2).

Power controller 302 also includes a micro-controller 308 to control overall operation of the power controller, and a high-side current monitor, denoted generally at 309, coupled to the micro-controller. In an example, micro-controller 308 may include an Analog Devices LTC4292/LTC4291, modified to support operations presented herein. In addition to new power control techniques described herein, micro-controller 308 may also perform basic power provisioning processes defined under the IEEE 802.3xx Ethernet standards, including detection, optional classification, and disconnection. High-side current monitor 309 detects when either of the high-side currents supplied from high voltage rail V+ to center taps CT(1), CT(2) exceeds a predetermined current threshold (i.e., an overcurrent threshold, e.g., 3.8 A), and responds to such an overcurrent condition, as described below. Current monitor 309 includes high-side, center tap, current sense comparators 310(1), 310(2) coupled to center taps CT(1), CT(2), respectively, to detect the overcurrent condition in the respective center tap, a time-threshold circuit 312 (also referred to as a "set/clear delay" circuit) coupled to/driven by outputs of the comparators, a controlled current source/generator 314 (e.g., a current mirror) coupled to/driven by an output of the time-threshold circuit, and a top-section of a resistor network 316 (described in detail below) coupled to/driven by the controlled current source and also coupled to the micro-controller 308 (i.e., the controlled current source is coupled between high voltage rail V+ and the top-section of the resistor network).

Comparators 310(1), 310(2) and sense resistors 306(1), 306(2) collectively represent a comparator module or circuit 315. Each comparator 310(i) includes comparator inputs (+, −) to receive a voltage difference generated across sense resistor 306(i) (generated by the respective high-side current flowing through the sense resistor) that is representative of a magnitude of the respective high-side current flowing through center tap CT(i). Outputs of comparators 310(1) and 310(2) are wire-OR'd together to produce a control signal CS that indicates that either (i) at least one of the high-side currents flowing through center taps CT(1), CT(2) exceeds the overcurrent threshold (i.e., are in an overcurrent condition), or (ii) none of the high-side currents exceeds the overcurrent threshold.

Time-threshold circuit 312 includes a latch-and-timer delay circuit that responds to control signal CS. More specifically, time-threshold circuit 312 generates a signal to turn-on controlled current source 314 only when both of the following two conditions are satisfied: (i) control signal CS indicates that at least one of the high-side currents exceeds the overcurrent threshold (i.e., is in the overcurrent condition), and (ii) the overcurrent condition indicated by control signal CS has persisted for a predetermined period of time without an intervening reset caused when the control signal changes to indicate that the overcurrent threshold is no longer exceeded. Time-threshold circuit 312 may emulate ICUT/ILIM timers used under IEEE 802.3xx. When the two conditions (i) and (ii) are not both met, time-threshold circuit 312 generates a signal to turn-off controlled current source 314. When controlled current source 314 is turned-on or turned-off, the controlled current source supplies current indicative of the over current condition or does not supply that current from high voltage rail V+ to resistor network 316, respectively.

In addition to the high-side current paths 307(1), 307(2) described above, power controller 302 also includes low-side current paths 322(1), 322(2) coupled to low voltage rail V−, a bottom section of resistor network 316, micro-controller 308, and low-side center taps CT(3), CT(4), respectively. Under control of micro-controller 308, low-side current paths 322(1), 322(2) selectively supply low-side currents (e.g., 3 A each) from low voltage rail V− to low-side center taps CT(3), CT(4), respectively. Current path 322(1) includes a main channel or branch M(1) and a helper channel or branch H(1) connected in parallel with the main branch to provide low-side current from low voltage rail V− to center tap CT(3). Parallel branches M(1), H(1) enable low-side current path 322(1) to provide double the low-side current than would otherwise be possible with only a single branch. Similarly, low-side current path 322(2) includes a main channel or branch M(2) and a helper channel or branch H(2) connected in parallel with each other to provide low-side current from low voltage rail V− to center tap CT(4). Parallel branches M(2), H(2) enable low-side current path 322(2) to provide double the low-side current than would otherwise be possible with only a single branch.

Main branch M(1) of low-side current path 322(1) includes a sense resistor 324M(1) (which is part of the bottom section of resistor network 316), a switch 326M(1), and a respective fuse F coupled in series with each other between low voltage rail V− and center tap CT(3). Switch 326M(1) may be selectively opened or closed to supply or not supply low-side current from low voltage rail V− to center tap CT(3) responsive to a control signal G1A asserted by micro-controller 308. That is, switch 326M(1) selectively connects or disconnects low voltage rail V− to or from center tap CT(3) based on control signal G1A. In an example, switch 326M(1) includes a field effect transistor (FET) having a source-drain current path coupled in series with sense resistor 324M(1), and also includes a gate coupled to control signal G1A (i.e., to a micro-controller output that generates the control signal). A drain of the FET is connected to a drain sense input D1 of micro-controller 308. When switch 326M(1) is closed, sense resistor 324M(1) converts current flowing in main branch M(1), e.g., through center tap CT(3), to a sense voltage sense 1A representative of a magnitude of the current, and provides the sense voltage to a respective input of micro-controller 308.

Similarly, helper branch H(1) of low-side current path 322(1) includes a sense resistor 324H(1) (which is part of the bottom section of resistor network 316), a switch 326H(1) (e.g., a FET) connected in series with each other between low voltage rail V− and center tap CT(3). Switch 326H(1) may be selectively opened or closed to supply or not supply low-side current from low voltage rail V− to center tap CT(3) responsive to a control signal G2A asserted by micro-controller 308. When switch 326H(1) is closed, sense resistor 324H(1) converts current flowing in helper branch MH(1), e.g., through center tap CT(3), to a sense voltage sense 2A representative of a magnitude of the current, and provides the sense voltage to a respective input of micro-controller 308.

Similar to main branch M(1), main branch M(2) of low-side current path 322(2) includes a sense resistor 324M(2) (which is part of the bottom section of resistor network 316), a switch 326M(2) (e.g., a FET), and a respective fuse F coupled in series with each other between low voltage rail V− and center tap CT(4). Switch 326M(2) may be selectively opened or closed to supply or not supply low-side current from low voltage rail V− to center tap CT(4) responsive to a control signal G1B asserted by micro-controller 308. When switch 326M(2) is closed, sense resistor 324M(2) converts current flowing in main branch M(2), e.g., through center tap CT(4), to a sense voltage sense 1B, and provides the sense voltage to a respective input of micro-controller 308.

Similarly, helper branch H(2) of current path 322(2) includes a sense resistor 324H(2) (which is part of the bottom section of resistor network 316) and a switch 326H(2) (e.g., a FET) connected in series with each other between low voltage rail V− and center tap CT(4). Switch 326H(2) may be selectively opened or closed to supply or not supply low-side current from low voltage rail V− to, e.g., center tap CT(4), responsive to a control signal G2B asserted by micro-controller 308. When switch 326H(2) is closed, sense resistor 324H(2) converts current flowing in helper branch H(2), e.g., through center tap CT(4), to a sense voltage sense 2B representative of a magnitude of the current, and provides the sense voltage to a respective input of micro-controller 308.

Resistor network 316 includes resistor paths R(1)-R(4) connected in parallel with each other between an output of controlled current source 314 and low voltage rail V−. Each path R(i) respectively includes the following resistors connected in series with each other: a top (section) resistor T(i), a bottom (section) resistor, including a respective one of sense resistors 324H(1), 324H(2), 324M(1), and 324M(2) as shown in FIG. 2; and a middle (section) resistor C(i) coupled between the top and the bottom section resistors. In each resistor path R(i), a connection node, also referred to as a "sense node," between middle resistor C(i) and top resistor T(i) is coupled to micro-controller 308. Resistor paths R(1)-R(4) represent potential dividers that develop sense voltages sense 2A, sense 2B, sense 1A, and sense 1B at the respective sense nodes mentioned above responsive to currents flowing through the resistor paths. Resistor network 316 is shown by way of example, only. It is understood that many other resistor networks may be used to achieve similar results to that of resistor network 316.

Micro-controller 308 receives various control signals/commands 340. Commands 340 include a first configuration command issued prior to normal operation of controller 30, to program/set respective voltage thresholds for sense voltages sense 1A, 1B, 2A, and 2B, i.e., against which the micro-controller 308 compares the sense voltages in normal operation. The voltage thresholds represent current thresholds, i.e., overcurrent thresholds (e.g., 3.8 A), above which overcurrent conditions are declared. In an example, the respective voltage thresholds are the same.

Commands 340 also include a second configuration command (also referred to as helper enable command) and a third configuration command (also referred to as a helper disable command) issued prior to normal operation. The helper enable command indicates that main branches M(1), M(2) are to be turned-on and helper branches H(1), H(2) are to be turned-on during normal operation. The helper disable command indicates that main branches M(1), M(2) are to be turned-on while helper branches H(1), H(2) are to be turned-off during normal operation. Micro-controller 308 initially closes all switches 326H(1), 326H(2), 326M(1), 326M(2) responsive to the helper enable command. Micro-controller 308 initially closes switches 326M(1), 326M(2) and initially opens switches 326H(1), 326H(2) responsive to the helper disable command.

Commands 340 further include an interlock satisfied command and an interlock not satisfied command to indicate that an Ethernet cable connector is properly plugged-into Ethernet port 304 and is not properly plugged-into the Ethernet port, respectively. For safety reasons, micro-controller opens all switches 326H(1), 326H(2), 326M(1), 326M(2) responsive to the interlock not satisfied command, and does not open all of the switches responsive to the interlock satisfied command.

Operations performed by PSE controller 302 during normal operation are now described. The normal operation assume that PSE controller 302 is turned-on, i.e., the circuits of the PSE controller shown in FIG. 3 are powered-on, and that voltage rails V+ and V− are held at the high voltage and the low voltage, respectively.

Upon receiving a helper enable command, an interlock satisfied command, and a command to set the voltage thresholds for sense voltages sense 1A, 1B, 2A, and 2B, micro-controller 308 sets the voltage thresholds, and closes switches 326M(1), 326M(2), 326H(1), and 326H(2) (collectively referred to as switches 326). As a result, low-side current paths 322(1), 322(2) supply low-side current to center taps CT(3) and CT(4), respectively. In addition, high voltage rail V− supplies high-side current to center taps CT(1) and CT(2). Comparator circuit 315 monitors the high-side currents, i.e., detects whether either of the high-side currents exceeds an overcurrent threshold indicative of an overcurrent condition. Micro-controller 308 monitors sense voltages sense 1A, 1B, 2A, and 2B. More specifically, micro-controller 308 detects whether any of sense voltages sense 1A, 1B, 2A, and 2B exceeds the voltage threshold(s) indicative of an overcurrent condition in any of the high-side currents and the low-side currents, as will be described below.

In normal operation, PSE controller 302 may operate in any of four scenarios based on behavior of the high-side and the low-side currents, as is now described.

In a first scenario, referred to as a normal operating condition, none of the high-side currents and none of the low-side currents exceed a respective overcurrent threshold, i.e., none of the currents are in an overcurrent condition. As a result, on the high-side, comparator circuit 315 generates control signal CS to indicate that both of the high-side currents flowing through CT(1), CT(2) are below the overcurrent threshold established for the high-side currents, i.e., that neither high-side current exceeds the overcurrent threshold. In response, time-threshold circuit 312 turns-off controlled current source 314, so that the controlled current source does not supply current to resistor paths R(1)-R(4).

At the same time, on the low-side, only the low-side currents flowing in low-side current paths 322(1), 322(2) and through center taps CT(3), CT(4) cause sense resistors 324H(1), 324H(2), 324M(1), and 324M(2) to (i) convert the currents to sense voltages sense 2A, 2B, 1A, and 1B representative of the magnitude of the currents, respectively, and (ii) apply the sense voltages to micro-controller 308 via the respective sense nodes of resistor paths R(1)-R(4). Micro-controller 308 determines whether any of sense voltages sense 2A, 2B, 1A, and 1B exceed the voltage threshold representative of the overcurrent threshold (which may be the same across all sense voltages). Because none of the currents exceed the overcurrent threshold, the sense voltages are nominal, and none of the sense voltages exceeds the voltage threshold, as determined by micro-controller 308. In response, micro-controller 308 takes no action, i.e., the micro-controller maintains all of switches 326 in their closed positions.

In a second scenario, referred to as a "low-side overcurrent condition," none of the high-side currents exceed the overcurrent threshold, but at least one of the low-side currents exceeds the overcurrent threshold. On the high-side, controlled current source 314 remains turned-off for the same reasons the controlled current source is turned-off under the normal operating condition. On the other hand, on the low-side, the at least one high-side current that exceeds the overcurrent threshold causes at least one of the sense voltages sense 2A, 2B, 1A, and 1B to correspondingly exceed the voltage threshold. Upon detecting that the at least one of the sense voltages sense 2A, 2B, 1A, and 1B exceeds the threshold voltage, micro-controller 308 opens one or more of switches 326 to reduce or stop low-side current flowing through center taps CT(3), CT(4). In one example, micro-controller 308 opens all of switches 326, to completely remove the low-side current from center taps CT(1), CT(2). In another example, micro-controller opens only a subset of switches 326 to reduce the low-side current, e.g., only helper switches 326H(1), 326H(2) to prevent the helper branches from supplying low-side current.

In a third scenario, referred to as a "high-side overcurrent condition," at least one the high-side currents exceeds the overcurrent threshold for the predetermined time required by time-threshold circuit 312 in order to signal the over current condition, but none of the low-side currents exceed the overcurrent threshold. As a result, on the high-side, comparator circuit 315 generates control signal CS to indicate that at least one of the high-side currents flowing through CT(1), CT(2) exceeds the overcurrent threshold for the predetermined period. In response, time-threshold circuit 312 turns-on controlled current source 314, so that the controlled current source supplies current to each of resistor paths R(1)-R(4). The current supplied by controlled current source 314 flows through each of resistor paths R(1)-R(4), including through respective low-side sense resistors 326H(1), 326H(2), 326M(1), and 326M(2). The currents supplied by controlled current source 314 to low-side sense resistors 326H(1), 326H(2), 326M(1), and 326M(2) are referred to as "additional currents" that flow through the low-side sense resistors only when one of the high-side currents exceeds the overcurrent threshold, as detected by comparator circuit 315. Thus, top resistors T(1)-T(4) add or supply current to bottom resistors 324H(1), 324H(2), 324M(1), and 324M(2) to trigger a shutdown of the low-side currents in the event of the overcurrent condition in either of high-side center taps CT(1), CT(2).

At the same time, on the low-side, the low-side currents that flow in current paths 322(1), 322(2) through center taps CT(3), CT(4) also flow through low-side sense resistors 326H(1), 326H(2), 326M(1), and 326M(2). Thus, a sum of (i) the additional currents supplied by current source 314, and (ii) the low-side currents (that flow through center taps CT(3) and CT(4)) flows through low-side sense resistors 326H(1), 326H(2), 326M(1), and 326M(2). Sense resistors 324H(1), 324H(2), 324M(1), and 324M(2) convert the summed currents to sense voltages sense 2A, 2B, 1A, and 1B representative of the magnitude of the summed currents, and apply the sense voltages to micro-controller 308 via respective sense nodes of resistor paths R(1)-R(4). The effect of the additional currents is to increase one or more of sense voltages sense 2A, 2B, 1A, and 1B above their nominal voltages (as developed in the first scenario based on only the low-side currents without the additional currents injected into resistor network 316 by the high-side controlled current source), such that one or more of the sense voltages exceed the voltage threshold(s). In other words, the additional currents increase one or more of sense voltages sense 2A, 2B, 1A, and 1B above the voltage threshold(s). Thus, micro-controller 308 detects that one or more of the sense voltages exceeds the voltage threshold(s). In response, micro-controller 308 opens one or more of switches 326 to reduce or stop current flowing through center taps CT(3), CT(4), as described above.

In a fourth scenario, referred to as a "high-side and low-side overcurrent condition," one or more of the high-side currents exceeds the overcurrent threshold and one or more of the low-side currents exceeds the overcurrent threshold. The fourth scenario combines operations described in the second and third scenarios. Thus, in the fourth scenario, micro-controller 308 opens one or more of switches 326 to reduce or stop current flowing through center taps CT(3), CT(4), as described above.

Figure 4:
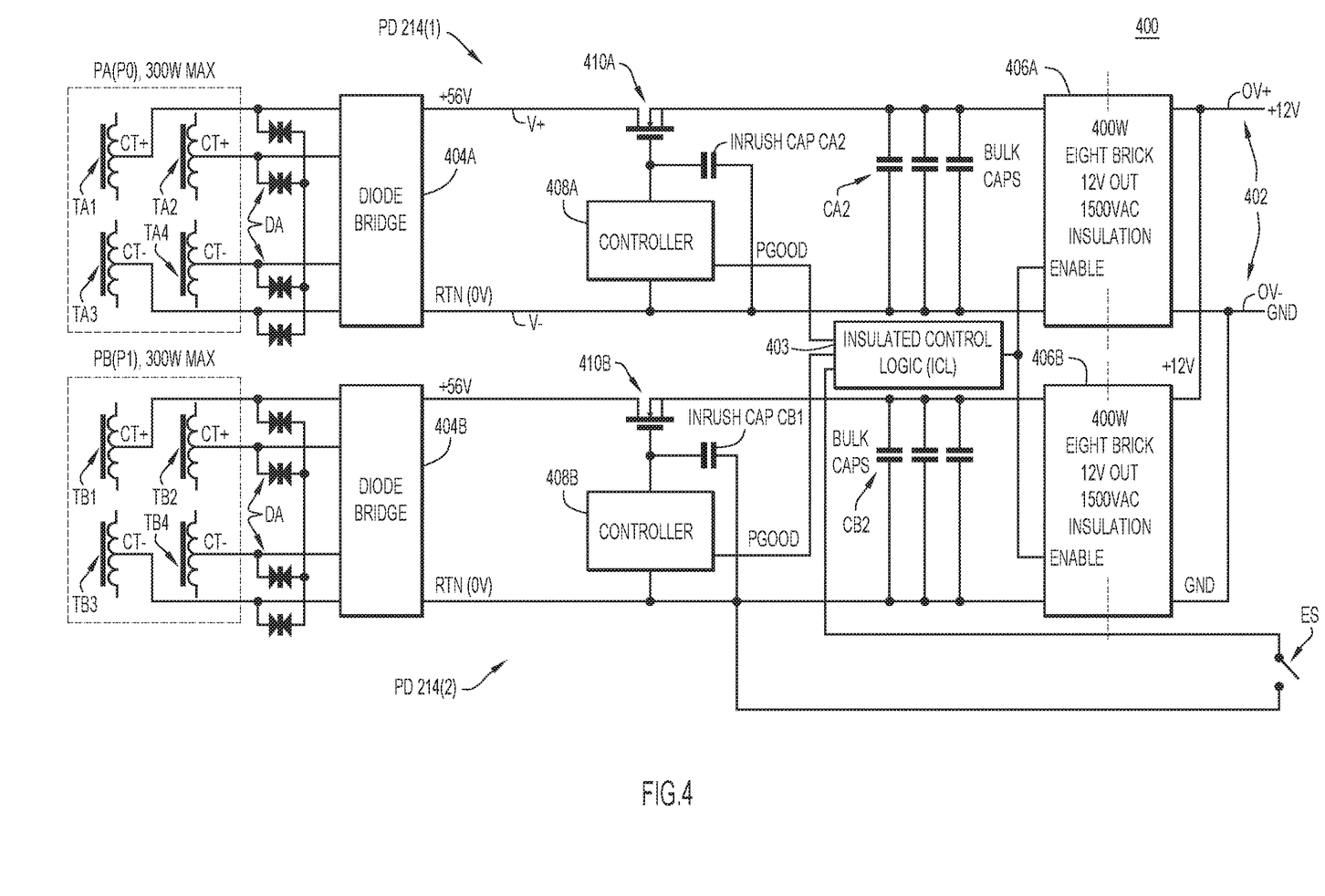
FIG. 4 is a block diagram of a combined PoE powered device (PD) that may be used in the configuration of FIG. 2, according to an example embodiment.

With reference to FIG. 4, there is a block diagram of example combined PD 400 that includes PDs 214(1) and 214(2). PDs 214(1) and 214(2) receive respective PoE originated at respective instances of PSE circuit 300 in parallel, over Ethernet cables. Each PD 214(i) converts the respective PoE to respective converted power. Combined PD 400 combines the converted powers at a combined output 402 in order to double an amount of converted power that can be made available to line card 210, compared to an arrangement that includes only a single PD. In addition to PDs 214(1) and 214(2), combined PD 400 includes electrically insulated control logic (ICL) 403 (also referred to below as "control gate ICL") to enable or disable operation of the combined PD under various conditions, and an enable switch ES connected to the control circuitry to manage the combined power ON/OFF conditions. Control gate ICL guarantees that each PD 214(i) is insulated from each other PD, as per PoE standards.

As shown in FIG. 4, PDs 214(1) and 214(2) have similar components denoted with an "A" or "B" suffix to differentiate between the PDs. PDs 214(1) and 214(2) are configured and operate similarly. Thus, the following description of PD 214(1) shall suffice for PD 214(2). For example, the description of components 404A, 406A, 408A, and 410A of PD 214(1) shall suffice for corresponding components 404B, 406B, 408B, and 410B of PD 214(2), and so on. PD 214(1) includes Ethernet port PA (corresponding to PD Ethernet port P0 in FIG. 3) with parallel transformers TA(1)-TA(4) (collectively referred to as transformers TA) similar to those described above, a diode bridge 404A coupled to respective center taps of the transformers, a power brick 406A coupled to the diode bridge via parallel high voltage and low voltage rails V+ and V−, a PD controller 408A coupled between the high voltage rail and the low voltage rail to control the PD, a FET switch 410A to selectively connect and disconnect the high voltage rail to and from the power brick under control of the PD controller, an inrush capacitor CA1 coupled to the FET and the low voltage rail, and bulk capacitors CA2 coupled to the high voltage rail and the low voltage rail. In an example, PD controller 408A may include an Analog Devices LTC4294. PD 214(1) may also include diode protection circuits DA coupled to transformers TA. It is understood that PDs 214(1), 214(2) are modified from conventional configurations to manage the extra power provided to the PDs by corresponding high-power PSEs 300.

PD 214(1) operates under control of PD controller 408A and control gate ICL. The following operation assumes the following setup conditions: control gate ICL provides an enable signal (as opposed to a disable signal) to an enable input of power brick 406A; and PD controller 408A maintains FET switch 410A in a closed position, so that the FET switch passes any voltage on high voltage rail V+ produced by diode bridge 404A to power brick 406A. Under these conditions, at a high-level, PD 214(1) operates as a direct current (DC)-to-DC converter that converts PoE voltage received at Ethernet port PA (e.g., that was originated at a respective PSE circuit 300) to a converted voltage at combined output 402. More specifically, respective center taps of transformers TA provide PoE voltages to respective inputs of diode bridge 404A. Diode bridge 404A converts the PoE voltages to a PoE high voltage and a PoE low voltage and applies the voltages to respective ones of voltage rails V+ and V−. Power brick 406A converts the PoE voltage applied across voltage rails V+ and V− to a converted voltage/power applied across output voltage rails OV+ and OV−.

With similar setup conditions as described above with respect to PD 214(1), PD 214(2) operates similarly to PD 214(1) to convert PoE voltage received at Ethernet port PB (corresponding to PD Ethernet port P1 in FIG. 3) to a converted voltage that is also applied to output 402, i.e., across output voltage rails OV+ and OV−. In the above described operation of combined PD 400, control gate ICL receives a respective PDGOOD signal from each PD controller 408A, 408B. The PDGOOD signal indicates whether the respective one of PDs 214(1), 214(2) is ready for operation or is not ready for operation. Control gate ICL also receives an input from enable switch ES that indicates whether the enable switch is open or closed. Control gate ICL provides the enable signal to the enable inputs of power bricks 406A, 406B to turn-on the power bricks only when the PDGOOD signals indicate that both PDs 214(1), 214(2) are ready (i.e., enabled by their respective PD controllers), and the enable switch ES is closed. Otherwise, control gate ICL asserts the disable signal, which turns-off power bricks 406A, 406B.

The embodiments depicted in FIGS. 1-4 represent a system including first chassis (or rack) 102(1) including PSU 202 to generate power, and RP/C 208 powered by the PSE and configured to originate data including commands directed to control plane features of a network. RP/C 208 includes Ethernet ports P0 of set SA and P3 of set SB to couple to respective Ethernet cables 220(1) and 220(2), in parallel, the data and the power as power-over-Ethernet (PoE). Second chassis 102(2) includes multiple PDs 214(1) and 214(2) having respective Ethernet ports P0 and P1 to connect to respective ones of the Ethernet cables. Each PD 214(i) is configured to convert the PoE received at the respective Ethernet port to a respective converted power. A power circuit, such as wire OR'ing of the respective outputs of PDs 214(1) and 214(2) (as shown in FIG. 4), combines or sums the respective converted powers into a summed power used to powers line card 210. In an embodiment in which the respective PoEs delivered to each PD is approximately 300 W, the summed power is approximately 600 W.

Figure 5:
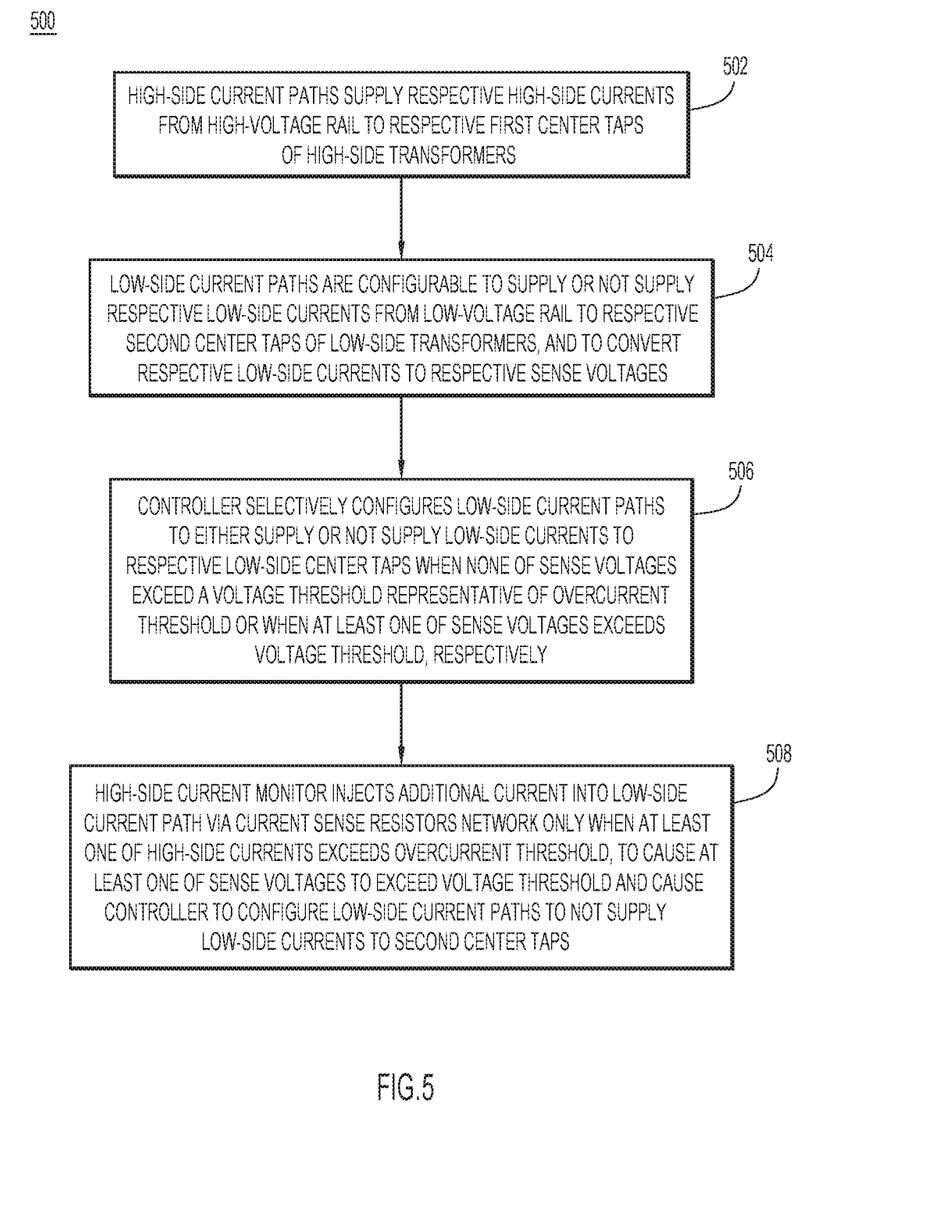
FIG. 5 is a flowchart of high-level operations performed by the PSE circuit, according to an example embodiment.

With reference to FIG. 5, there is a flowchart of high-level operations 500 performed by PSE circuit 300 (also referred to more simply as PSE 300), including power controller 302 and Ethernet port 304.

At 502, high-side current paths 307(1) and 307(2) supply respective high-side currents from high voltage (power) rail V+ to respective high-side center taps CT(1) and CT(2) of high-side transformers 304(1) and 304(2).

At 504, low-side current paths 322(1) and 322(2) are configurable to supply or not supply respective low-side currents from low voltage (power) rail V− to respective low-side center taps CT(3) and CT(4) of low-side transformers 304(3) and 304(4), and to convert the respective low-side currents to respective sense voltages sense 1B, 1A, 2B, and 2A.

At 506, micro-controller 308 selectively configures low-side current paths 322(1) and 322(2) to either supply or not supply the low-side currents to respective low-side center taps CT(3) and CT(4) when none of the sense voltages sense 1B, 1A, 2B, and 2A exceed a voltage threshold representative of an overcurrent threshold or when at least one of the sense voltages exceeds the voltage threshold, respectively.

At 508, high-side current monitor 309 injects additional current into low-side current paths 322(1) and 322(2) only when at least one of the high-side currents exceeds the overcurrent threshold, to cause at least one of sense voltages sense 1B, 1A, 2B, and 2A to exceed the voltage threshold and cause micro-controller 308 to configure the low-side current paths to not supply the low-side currents to low-side center taps CT(3) and CT(4).

In summary, embodiments presented herein virtualize a backplane of a chassis using standard Ethernet cables that bring control and power from control and power cards in a first chassis to line cards in a second chassis separated from the first chassis. The cards of the first chassis power and communicate with the cards of the second chassis. The embodiments present and extended PoE circuit to increase PoE above existing standards. More specifically, power is distributed over the control plane of a network device via Ethernet cables.

In summary, in one form, an apparatus is provided comprising: an Ethernet port including transformers to couple respective data and power to an Ethernet cable, the transformers including high-side transformers and low-side transformers; high-side current paths to supply respective high-side currents form a high voltage rail to respective high-side center taps of the high-side transformers; low-side current paths configurable to supply or not supply respective low-side currents from a low voltage rail to respective low-side center taps of the low-side transformers, and to convert the respective low-side currents to respective sense voltages; a controller to selectively configure the low-side current paths to either supply or not supply the low-side currents to the respective low-side center taps when none of the sense voltages exceed a voltage threshold representative of an overcurrent threshold or when at least one of the sense voltages exceeds the voltage threshold, respectively; and a current monitor to inject additional current into the low-side current paths only when at least one of the high-side currents exceeds the overcurrent threshold, to cause at least one of the sense voltages to exceed the voltage threshold, and cause the controller to configure the low-side current paths to not supply the low-side currents to the low-side center taps.

The additional current injected into the low-side current paths causes at least one of the sense voltages to exceed the voltage threshold even when none of the low-side currents in the low-side center taps exceed the overcurrent threshold.

Each low-side current path includes a respective at least one current branch having a switch and a sense resistor connected in series with each other to couple the low voltage rail to the respective low-side center tap, the switch configurable by the controller to connect or disconnect the respective low-side center tap to or from the low voltage rail to supply or not supply the respective low-side current to the respective low-side center tap, respectively, the sense resistor configured to convert the respective low-side current to the respective sense voltage. Also, the current monitor is configured to inject the additional current through the sense resistor of the respective at least one current branch.

Each low-side current path includes multiple respective current branches connected in parallel with each other to supply the respective low-side current to the respective low-side center tap, each of the multiple current branches respectively including a switch and a sense resistor connected in series.

The current monitor includes: resistor paths each coupled to a respective one of the sense resistors; and a current source, coupled to the high voltage rail and to each of the resistor paths, to inject the additional current into the resistor paths and the respective one of the sense resistors only when at least one of the high-side currents exceeds the overcurrent threshold.

Each resistor path and the respective one of the sense resistors coupled to the resistor path are configured as a resistive divider having a respective voltage tap to generate the respective sense voltage.

The sense resistor is connected to the low voltage rail, and the switch includes a power field effect transistor (FET) having a source-drain path connected to the sense resistor and the low-side center tap, and a gate coupled to the controller.

The current monitor includes: a current source coupled to the high voltage rail and the high-side current paths; and a current comparator circuit, coupled to each low-side center tap and to the current source, to provide a control signal indicating whether at least one of the high-side currents exceeds the overcurrent threshold or none of the high-side currents exceeds the over current threshold.

The current comparator circuit includes multiple current comparators each to compare the high-side current in a respective one of the high-side center taps to the overcurrent threshold, and to generate a respective control signal indicative of whether the high-side current exceeds or does not exceed the overcurrent threshold.

Each low-side current path includes multiple respective current branches connected in parallel with each other to supply current from the low voltage rail to the respective low-side center tap in parallel, each current branch including a respective switch configurable by the controller to connect and disconnect the low voltage rail to the respective low-side center tap.

The controller is configured to, upon receiving a first command, configure all of the switches to connect the low voltage rail to the respective low-side center taps. Also, the controller is configured to, upon receiving a second command, configure a first subset of the switches to connect the low voltage rail to the respective low-side center taps and configure a second subset of the switches to disconnect the low voltage rail to the respective low-side center taps.

The data includes commands originated from a router processor and destined for a switch line card or switch fabric card, and the commands include commands to implement a control plane of a network.

The high-side currents and the low-side currents have magnitudes for delivering approximately 300 Watts of power-over-Ethernet (PoE) to the Ethernet cable.

In another form, a method is provided comprising: at power sourcing equipment (PSE) including an Ethernet port having transformers to couple respective data and power to an Ethernet cable, the transformers including high-side transformers and low-side transformers, the PSE including high-side current paths to supply respective high-side currents to respective high-side center taps of the high-side transformers, and low-side current paths configurable to supply or not supply respective low-side currents from a low voltage rail to respective low-side center taps of the low-side transformers, and to convert the respective low-side currents to respective sense voltages: selectively configuring the low-side current paths to either supply or not supply the low-side currents to the respective low-side center taps when none of the sense voltages exceed the voltage threshold representative of an overcurrent threshold or when at least one of the sense voltages exceeds the voltage threshold, respectively; and injecting additional current into the low-side current paths only when at least one of the high-side currents exceeds the overcurrent threshold, to cause at least one of the sense voltages to exceed the voltage threshold and, in response, cause the low-side current paths to not supply the low-side currents to the low-side center taps.

The injecting includes injecting the additional current into the low-side current paths to cause at least one of the sense voltages to exceed the voltage threshold even when none of the low-side currents in the low-side center taps exceed the overcurrent threshold.

Each low-side current path includes a respective at least one current branch having a switch and a sense resistor connected in series with each other to couple the low voltage rail to the respective low-side center tap. Also, the selectively configuring the low-side current paths to either supply or not supply the low-side currents includes configuring the respective switch to connect or disconnect the respective center tap to or from the low voltage rail, respectively.

The injecting the additional current further includes injecting or not injecting the additional current into the low-side current paths responsive to a control signal indicating that at least one of the high-side currents exceeds the overcurrent threshold or none of the high-side currents exceeds the overcurrent threshold, respectively.

In yet another form a system is provided comprising: a first rack including: power sourcing equipment (PSE) to generate power; and a route processor powered by the PSE and configured to originate data including commands directed to control plane features of a network, the route processor including Ethernet ports to couple to respective Ethernet cables, in parallel, the data and the power as power-over-Ethernet (PoE); and a second rack including: multiple powered devices (PDs) having respective Ethernet ports to connect to respective ones of the Ethernet cables, each PD configured to convert the PoE received at the respective Ethernet port to a respective converted power; a power circuit to sum the respective converted powers into a summed power; and a switch line card to receive the data from the Ethernet ports of the PDs and powered by the summed power.

The PoE received at each Ethernet port is approximately 300 Watts, and the summed power is an integer multiple of the approximately 300 Watts.

One of the Ethernet ports of the route processor includes transformers to couple the data and the power to the respective Ethernet cable, the transformers including high-side transformers and low-side transformers, and the PSE includes: high-side current paths to supply respective high-side currents to respective high-side center taps of the high-side transformers; low-side current paths configurable to supply or not supply respective low-side currents from a low voltage rail to respective low-side center taps of the low-side transformers, and to convert the respective low-side currents to respective sense voltages; a controller to selectively configure the low-side current paths to either supply or not supply the low-side currents to the respective low-side center taps when none of the sense voltages exceed a voltage threshold representative of an overcurrent threshold or when at least one of the sense voltages exceeds the voltage threshold, respectively; and a current monitor to inject additional current into the low-side current paths only when at least one of the high-side currents exceeds the overcurrent threshold, to cause at least one of the sense voltages to exceed the voltage threshold and cause the controller to configure the low-side current paths to not supply the low-side currents to the low-side center taps.

The above description is intended by way of example only. Various modifications and structural changes may be made therein without departing from the scope of the concepts described herein and within the scope and range of equivalents of the claims.

What is claimed is:

1. An apparatus comprising:
an Ethernet port including transformers to couple respective data and power to an Ethernet cable, the transformers including high-side transformers and low-side transformers;
high-side current paths to supply respective high-side currents from a high voltage rail to respective high-side center taps of the high-side transformers;
low-side current paths configurable to supply or not supply respective low-side currents from a low voltage rail to respective low-side center taps of the low-side transformers, and to convert the respective low-side currents to respective sense voltages;

a controller to selectively configure the low-side current paths to either supply or not supply the low-side currents to the respective low-side center taps when none of the sense voltages exceed a voltage threshold representative of an overcurrent threshold or when at least one of the sense voltages exceeds the voltage threshold, respectively; and a current monitor to inject additional current into the low-side current paths only when at least one of the high-side currents exceeds the overcurrent threshold, to cause at least one of the sense voltages to exceed the voltage threshold, and cause the controller to configure the low-side current paths to not supply the low-side currents to the low-side center taps.

2. The apparatus of claim 1, wherein the additional current injected into the low-side current paths causes at least one of the sense voltages to exceed the voltage threshold even when none of the low-side currents in the low-side center taps exceed the overcurrent threshold.

3. The apparatus of claim 1, wherein:

each low-side current path includes a respective at least one current branch having a switch and a sense resistor connected in series with each other to couple the low voltage rail to the respective low-side center tap, the switch configurable by the controller to connect or disconnect the respective low-side center tap to or from the low voltage rail to supply or not supply the respective low-side current to the respective low-side center tap, respectively, the sense resistor configured to convert the respective low-side current to the respective sense voltage; and the current monitor is configured to inject the additional current through the sense resistor of the respective at least one current branch.

4. The apparatus of claim 3, wherein each low-side current path includes multiple respective current branches connected in parallel with each to supply the respective low-side current to the respective low-side center tap, each of the multiple respective current branches respectively including a switch and a sense resistor connected in series.

5. The apparatus of claim 3, wherein the current monitor includes:

resistor paths each coupled to a respective one of the sense resistors; and a current source, coupled to the high voltage rail and to each resistor path, to inject the additional current into the resistor paths and the respective one of the sense resistors only when at least one of the high-side currents exceeds the overcurrent threshold.

6. The apparatus of claim 5, wherein each resistor path and the respective one of the sense resistors coupled to the resistor path are configured as a resistive divider having a respective voltage tap to generate the respective sense voltage.

7. The apparatus of claim 3, wherein:

the sense resistor is connected to the low voltage rail; and the switch includes a power field effect transistor (FET) having a source-drain path connected to the sense resistor and the low-side center tap, and a gate coupled to the controller.

8. The apparatus of claim 1, wherein the current monitor includes:

a current source coupled to the high voltage rail and the high-side current paths; and a current comparator circuit, coupled to each low-side center tap and to the current source, to provide a control signal indicating whether at least one of the high-side currents exceeds the overcurrent threshold or none of the high-side currents exceeds the over current threshold, wherein the current source is configured to inject or not inject the additional current into the low-side current paths responsive to the control signal indicating that at least one of the high-side currents exceeds the overcurrent threshold or none of the high-side currents exceeds the overcurrent threshold, respectively.

9. The apparatus of claim 8, wherein the current comparator circuit includes multiple current comparators each to compare the high-side current in a respective one of the high-side center taps to the overcurrent threshold, and to generate a respective control signal indicative of whether the high-side current exceeds or does not exceed the overcurrent threshold.

10. The apparatus of claim 1, wherein each low-side current path includes multiple respective current branches connected in parallel with each other to supply current from the low voltage rail to the respective low-side center tap in parallel, each current branch including a respective switch configurable by the controller to connect and disconnect the low voltage rail to the respective low-side center tap.

11. The apparatus of claim 10, wherein:

the controller is configured to, upon receiving a first command, configure all of the switches to connect the low voltage rail to the respective low-side center taps; and the controller is configured to, upon receiving a second command, configure a first subset of the switches to connect the low voltage rail to the respective low-side center taps and configure a second subset of the switches to disconnect the low voltage rail to the respective low-side center taps.

12. The apparatus of claim 1, wherein the data includes commands originated from a router processor and destined for a switch line card or switch fabric card, and the commands include commands to implement a control plane of a network.

13. The apparatus of claim 12, wherein the high-side currents and the low-side currents have magnitudes for delivering approximately 300 Watts of power-over-Ethernet (PoE) to the Ethernet cable.

14. A method comprising:

at power sourcing equipment (PSE) including an Ethernet port having transformers to couple respective data and power to an Ethernet cable, the transformers including high-side transformers and low-side transformers, the PSE including high-side current paths to supply respective high-side currents to respective high-side center taps of the high-side transformers, and low-side current paths configurable to supply or not supply respective low-side currents from a low voltage rail to respective low-side center taps of the low-side transformers, and to convert the respective low-side currents to respective sense voltages:

selectively configuring the low-side current paths to either supply or not supply the low-side currents to the respective low-side center taps when none of the sense voltages exceed a voltage threshold representative of an overcurrent threshold or when at least one of the sense voltages exceeds the voltage threshold, respectively; and injecting additional current into the low-side current paths only when at least one of the high-side currents exceeds the overcurrent threshold, to cause at least one of the sense voltages to exceed the voltage threshold and, in response, cause the low-side current paths to not supply the low-side currents to the low-side center taps.

15. The method of claim 14, wherein the injecting includes injecting the additional current into the low-side current paths to cause at least one of the sense voltages to exceed the voltage threshold even when none of the low-side currents in the low-side center taps exceed the overcurrent threshold.

16. The method of claim 14, wherein:
each low-side current path includes a respective at least one current branch having a switch and a sense resistor connected in series with each other to couple the low voltage rail to the respective low-side center tap; and
the selectively configuring the low-side current paths to either supply or not supply the low-side currents includes configuring the respective switch to connect or disconnect the respective center tap to or from the low voltage rail, respectively.

17. The method of claim 14, wherein:
the injecting the additional current further includes injecting or not injecting the additional current into the low-side current paths responsive to a control signal indicating that at least one of the high-side currents exceeds the overcurrent threshold or none of the high-side currents exceeds the overcurrent threshold, respectively.

18. A system comprising:
a first rack including:
power sourcing equipment (PSE) to generate power; and
a route processor powered by the PSE and configured to originate data including commands directed to control plane features of a network, the route processor including Ethernet ports to couple to respective Ethernet cables, in parallel, the data and the power as power-over-Ethernet (PoE); and
a second rack including:
multiple powered devices (PDs) having respective Ethernet ports to connect to respective ones of the Ethernet cables, each PD configured to convert the PoE received at the respective Ethernet port to a respective converted power;
a power circuit to sum the respective converted powers into a summed power; and
a switch line card to receive the data from the Ethernet ports of the PDs and powered by the summed power;
wherein the PoE received at each Ethernet port is approximately 300 Watts, and the summed power is an integer multiple of the approximately 300 Watts.

19. A system comprising:
a first rack including:
power sourcing equipment (PSE) to generate power; and
a route processor powered by the PSE and configured to originate data including commands directed to control plane features of a network, the route processor including Ethernet ports to couple to respective Ethernet cables, in parallel, the data and the power as power-over-Ethernet (PoE); and
a second rack including:
multiple powered devices (PDs) having respective Ethernet ports to connect to respective ones of the Ethernet cables, each PD configured to convert the PoE received at the respective Ethernet port to a respective converted power;
a power circuit to sum the respective converted powers into a summed power; and
a switch line card to receive the data from the Ethernet ports of the PDs and powered by the summed power;
wherein one of the Ethernet ports of the route processor includes transformers to couple the data and the power to the respective Ethernet cable, the transformers including high-side transformers and low-side transformers, and the PSE includes:
high-side current paths to supply respective high-side currents to respective high-side center taps of the high-side transformers;
low-side current paths configurable to supply or not supply respective low-side currents from a low voltage rail to respective low-side center taps of the low-side transformers, and to convert the respective low-side currents to respective sense voltages;
a controller to selectively configure the low-side current paths to either supply or not supply the low-side currents to the respective low-side center taps when none of the sense voltages exceed a voltage threshold representative of an overcurrent threshold or when at least one of the sense voltages exceeds the voltage threshold, respectively; and
a current monitor to inject additional current into the low-side current paths only when at least one of the high-side currents exceeds the overcurrent threshold, to cause at least one of the sense voltages to exceed the voltage threshold and cause the controller to configure the low-side current paths to not supply the low-side currents to the low-side center taps.

* * * * *